US012323509B2

(12) United States Patent
Yan et al.

(10) Patent No.: US 12,323,509 B2
(45) Date of Patent: Jun. 3, 2025

(54) METHOD FOR DATA PROCESSING, READABLE MEDIUM AND ELECTRONIC DEVICE

(71) Applicant: Beijing Volcano Engine Technology Co., Ltd., Beijing (CN)

(72) Inventors: Lu Yan, Beijing (CN); Yao Zhang, Beijing (CN); Dian Chen, Beijing (CN); Jingbin Liu, Beijing (CN); Ye Wu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/806,633

(22) Filed: Aug. 15, 2024

(65) Prior Publication Data
US 2025/0062892 A1 Feb. 20, 2025

(51) Int. Cl.
*H04L 9/08* (2006.01)
(52) U.S. Cl.
CPC ................. *H04L 9/0825* (2013.01)
(58) Field of Classification Search
None
See application file for complete search history.

(56) References Cited

U.S. PATENT DOCUMENTS

| | | |
|---|---|---|
| 2008/0141336 A1 | 6/2008 | Haller |
| 2015/0372991 A1* | 12/2015 | Katz .................... H04L 9/0819 713/168 |
| 2021/0211468 A1* | 7/2021 | Griffin ...................... H04L 9/50 |
| 2022/0006620 A1 | 1/2022 | Bursell et al. |

(Continued)

FOREIGN PATENT DOCUMENTS

| | | |
|---|---|---|
| CN | 110881063 A | 3/2020 |
| CN | 113742709 A | 12/2021 |

(Continued)

OTHER PUBLICATIONS

"Intel® Trust Domain Extensions (Intel® TDX) Isolation, confidentiality, and integrity at the virtual machine (VM) level."; https://www.intel.com/content/www/us/en/developer/tools/trust-domain-extensions/overview.html; Intel Corporation; accessed Aug. 15, 2024; 3 pages.

(Continued)

*Primary Examiner* — Bassam A Noaman
(74) *Attorney, Agent, or Firm* — BakerHostetler

(57) ABSTRACT

A method for data processing, a readable medium, and an electronic device are provided. The method for data processing includes: receiving a data processing task; determining target data corresponding to the data processing task and a target first key corresponding to the target data; decrypting the target first key according to the first session key via a target computing node to obtain the first key, and decrypting the target data based on the first key to obtain the data to be processed; and determining a data processing result according to a target model and the data to be processed. The target computing node is executed in a trusted execution environment. The target model is obtained by decrypting an encrypted target model based on a model key, the model key is stored in a key management service, and the key management service is executed in the trusted execution environment.

20 Claims, 5 Drawing Sheets

(56) References Cited

U.S. PATENT DOCUMENTS

| | | | | |
|---|---|---|---|---|
| 2022/0060455 A1* | 2/2022 | Rosenstein | ............ | H04L 9/0894 |
| 2023/0025754 A1* | 1/2023 | Hassanzadeh | ........... | H04L 9/008 |
| 2023/0388121 A1* | 11/2023 | Zhang | ................. | G06F 21/6245 |
| 2024/0160717 A1* | 5/2024 | Raghuram | ............... | G06F 21/53 |
| 2024/0169256 A1* | 5/2024 | Gong | ................... | G06N 3/0985 |

FOREIGN PATENT DOCUMENTS

| | | |
|---|---|---|
| CN | 114584307 A | 6/2022 |
| CN | 114629639 A | 6/2022 |
| CN | 114969784 A | 8/2022 |
| CN | 116506227 A | 7/2023 |
| CN | 117061105 A | 11/2023 |
| CN | 117061105 B | 1/2025 |
| WO | WO 2023/143037 A1 | 8/2023 |

OTHER PUBLICATIONS

"AMD Secure Encrypted Virtualization (SEV)"; https://www.amd.com/en/developer/sev.html; Advanced Micro Devices, Inc.; © 2024; accessed Aug. 15, 2024; 4 pages.

"Nvidia H100 Tensor Core GPU"; https://www.nvidia.com/en-us/data-center/h100/; Nvidia Corporation; © 2024; accessed Aug. 15, 2024; 10 pages.

China Patent Application No. 202311036146.7; Office Action; dated Sep. 21, 2024; 9 pages.

International Patent Application No. PCT/CN2024/112024; Int'l Search Report and Written Opinion; dated Nov. 18, 2024; 16 pages.

\* cited by examiner

METHOD FOR DATA PROCESSING, READABLE MEDIUM AND ELECTRONIC DEVICE

This application claims the priority and benefits to Chinese Patent Application No. 202311036146.7 filed on Aug. 16, 2023, and the disclosure of the Chinese Patent Application is hereby incorporated herein by reference in its entirety as part of this application.

TECHNICAL FIELD

Embodiments of the present disclosure relate to a method for data processing, an apparatus, a readable medium and an electronic device.

BACKGROUND

Large language models (LLMs) have a wide range of application scenarios in the field of artificial intelligence and natural language processing, and the LLMs involve a large amount of user data as well as modeling algorithms, thus the security of the data and the models becomes particularly important.

In the process of model fine-tuning or usage, it is required to obtain the corresponding models and data for model fine-tuning or model inference. In the process of obtaining data and models, when the data and models are maliciously stolen, it leads to data and model leakage. In addition, when using a cluster or cloud service for model fine-tuning or model inference, since the environment of the cluster or cloud service may be untrustworthy, the cluster nodes may also lead to data and model leakage in the process of data processing.

SUMMARY

In the first aspect, the present disclosure provides a method for data processing, the method includes:
receiving a data processing task;
determining target data corresponding to the data processing task and a target first key corresponding to the target data, in which the target data is obtained by encrypting data to be processed using a first key, the target first key is obtained by encrypting the first key using a first session key, and the first session key is obtained by negotiating between a task processor of the data processing task and a key holder of the first key;
decrypting the target first key according to the first session key via a target computing node to obtain the first key, and decrypting the target data based on the first key to obtain the data to be processed, in which the target computing node is executed in a trusted execution environment; and
determining a data processing result according to a target model and the data to be processed, in which the target model is obtained by decrypting an encrypted target model based on a model key, the model key is stored in a key management service, and the key management service is executed in the trusted execution environment.

In the second aspect, the present disclosure provides an apparatus for data processing, and the apparatus includes: a receiving module, a determination module, a decryption module and a processing module.

The receiving module is configured to receive a data processing task.

The determination module is configured to determine target data corresponding to the data processing task and a target first key corresponding to the target data, in which the target data is obtained by encrypting data to be processed using a first key, and the target first key is obtained by encrypting the first key using a first session key, and the first session key is obtained by negotiating between a task processor of the data processing task and a key holder of the first key.

The decryption module is configured to decrypt the target first key according to the first session key via a target computing node to obtain the first key, and decrypt the target data based on the first key to obtain the data to be processed, in which the target computing node is executed in a trusted execution environment.

The processing module is configured to determine a data processing result according to a target model and the data to be processed, in which the target model is obtained by decrypting an encrypted target model based on a model key, the model key is stored in a key management service, and the key management service is executed in the trusted execution environment.

In the third aspect, the present disclosure provides a computer-readable medium storing a computer program, in which the computer program, when executed by a processor, implements the method described in any one of the first aspects.

In a fourth aspect, the present disclosure provides an electronic device, and the electronic device includes: a memory and a processor.

The memory stores a computer program.

The processor is configured to execute the computer program in the memory to implement the method described in any one of the first aspects.

By the above technical solution, a data processing task is firstly received, then target data corresponding to the data processing task and a target first key corresponding to the target data are determined, and then the target first key is decrypted by the target computing node according to the first session key to obtain the first key, and the target data is decrypted based on the first key to obtain the data to be processed, and finally, according to the target model and the data to be processed, the determine the data processing result. The target data is obtained by encrypting the data to be processed using the first key, the target model is obtained by decrypting the encrypted target model based on the model key saved in the key management service, and the target computing node and the key management service are executed in a trusted execution environment.

BRIEF DESCRIPTION OF DRAWINGS

The foregoing and other features, beneficial effects, and aspects of embodiments of the present disclosure are become more apparent in conjunction with the accompanying drawings and with reference to the following specific embodiments. Throughout the accompanying drawings, the same or similar accompanying markings indicate the same or similar elements. It should be understood that the accompanying drawings are schematic and that the originals and elements are not necessarily drawn to scale. In the accompanying drawings.

DETAILED DESCRIPTION

Figure 1:
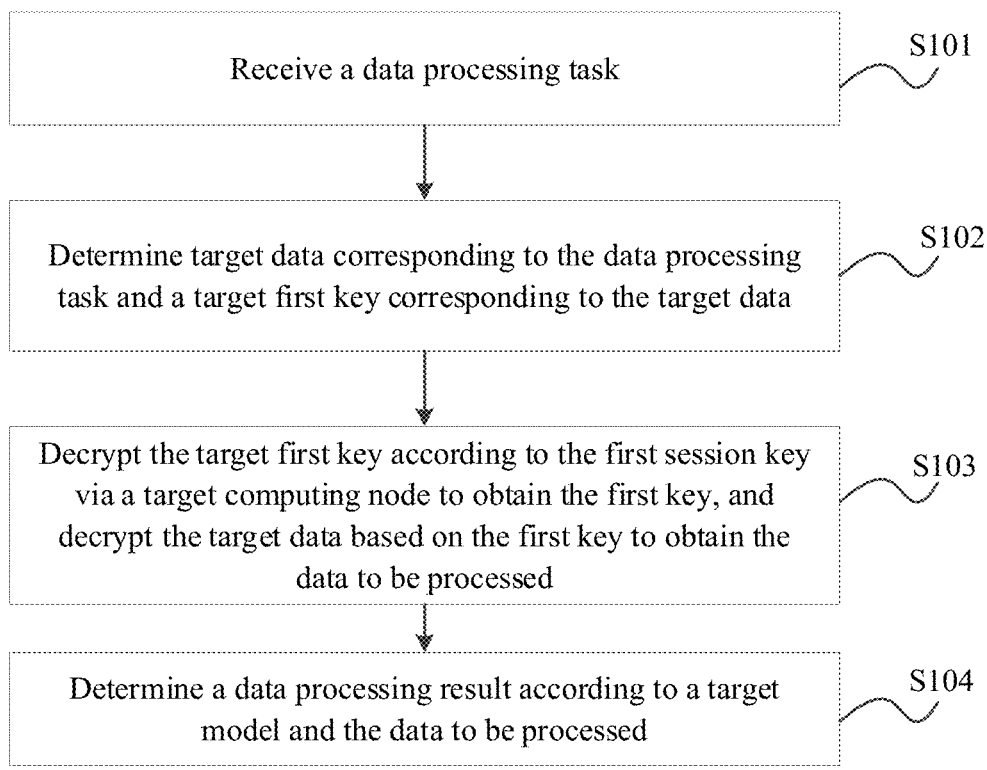
FIG. 1 is a schematic flow diagram of a method for data processing provided according to an exemplary embodiment.

Embodiments of the present disclosure are described in more detail below with reference to the drawings. Although certain embodiments of the present disclosure are illustrated in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that the modifications of "one" and "more" mentioned in the present disclosure are schematic rather than restrictive, and those skilled in the art should understand that unless otherwise explicitly stated in the context, it should be understood as "one or more".

The names of the messages or information interacting between the plurality of devices of the presently disclosed embodiments are used for illustrative purposes only and are not intended to limit the scope of those messages or information.

It is to be understood that before using the technical solutions disclosed in each embodiment of the present disclosure, the user should be informed of the type, scope of use, use scenario, etc. of the personal information involved in the present disclosure in accordance with relevant laws and regulations and the user's authorization should be obtained in an appropriate manner.

For example, in response to receiving an unsolicited request from a user, a prompting information is sent to the user to explicitly prompt the user that the requested operation will require access to and use of the user's personal information. Thereby, the user is enabled to independently choose whether or not to provide the personal information to software or hardware, such as an electronic device, an application, a server, or a storage medium, that performs an operation of the technical solution of the present disclosure based on the prompting information.

As an optional but non-limiting realization, in response to receiving the unsolicited request from the user, a manner of sending the prompting information to the user may be, for example, a pop-up window, in which the prompting information may be presented in form of text. In addition, the pop-up window may contain an option control for the user to select "agree" or "disagree" to provide the personal information to the electronic device.

It is to be understood that the above notification and obtaining user authorization process is only schematic, and does not limit the implementation of the present disclosure, and other ways to meet relevant laws and regulations may also be applied to the implementation of the present disclosure.

Moreover, it is understood that data involved in the present technical solution (including, but not limited to, the data itself, an acquisition or a use of the data) should comply with requirements of the corresponding laws and regulations and relevant provisions.

The large language model may be fine-tuned using a pre-trained large language model during a model fine-tuning process (e.g., Fine-tuning technique), and an application-specific large language model may be further generated using a specific training dataset. However, massive data and computational resources are required for model fine-tuning, and data may contain user information and sensitive data, and there is a risk of data and model leakage as the fine-tuning may be based on joint training with data from multiple sources. In addition, since the LLM has a large number of model parameters, it may be fine-tuned using cluster or cloud services, but the environment of cluster or cloud services may be untrustworthy, and there is also the risk of data and model leakage when interacting between cluster nodes.

In addition, in the process of deploying a large language model application after the model fine-tuning is completed, it may also have the risk of data and model leakage. When the large language model application is deployed in a third-party cloud platform, for a model service provider, it is required that its core assets, such as the models and all the inference code, are protected from leaking to anyone except the model service provider during deployment, upgrade and operation and maintenance. As for the customers using model inference services, the large language model may leak protected data such as users' information. When the data is used maliciously or leaked to unauthorized parties, it may lead to the violation of user data. And the large language model used may not necessarily be content and version of the model claimed by the model service provider, which may cause the problem of poor model inference when the model provided by the model service provider is not the claimed model.

Federated learning is the technique that can realize multi-party data joint modeling without data out of a domain, and on the basis of federated learning, differential privacy technique may be further added to protect training data, but the logic of the differential privacy technique is complicated, and it has the problems of high transformation cost, high difficulty of implementation, and high performance loss, and it cannot solve the problem of untrustworthiness of the cloud environment when the service is deployed. Alternatively, the technique of multi-party secure computing or homomorphic encryption is used to achieve joint modeling to achieve high security, but multi-party communication is required to determine the security of the communication, and the communication and computation overhead is large, which is not applicable to large-scale parameter scenarios such as the large language models.

Alternatively, fine-tuning or using the model by means of isolated domains or localized deployments mitigates the risk of data leakage to a certain extent, but users or entities having high privilege may still be able to steal the data, the applicable scenarios are limited, and the cloud infrastructure cannot be fully utilized to provide services.

The present disclosure provides a method and an apparatus for data processing, readable medium, and electronic device to solve the above problems. It should be understood that the method for data processing provided in the present disclosure may be applicable to application scenarios of other data processing models that require data protection, in addition to application scenarios of a large language model, and the present disclosure is not limited thereto.

Embodiments of the present disclosure are further explained and illustrated below in conjunction with the accompanying drawings.

FIG. 1 is a schematic flow diagram of a method for data processing illustrated according to an exemplary embodiment of the present disclosure. Referring to FIG. 1, the method for data processing provided by the embodiment of the present disclosure includes:

S101: receive a data processing task.

S102: determine target data corresponding to the data processing task and a target first key corresponding to the target data.

The target data is obtained by encrypting the data to be processed using the first key, the target first key is obtained by encrypting the first key using the first session key, and the first session key is obtained by negotiating between a task processor of the data processing task and a key holder of the first key.

S103: decrypt the target first key according to the first session key via a target computing node to obtain the first key, and decrypt the target data based on the first key to obtain the data to be processed.

The target computing node is executed in a trusted execution environment. It should be noted that the trusted execution environment (TEE) is a hardware-based security technology that constructs a secure computing environment isolated from the outside by dividing secure and non-secure portions, which can ensure the confidentiality and integrity of data and code loaded inside it. The TEE is isolated from the ordinary environment and has a higher security level, and therefore suitable for processing protected data in it.

S104: determine a data processing result according to a target model and the data to be processed.

The target model is obtained by decrypting an encrypted target model based on a model key, the model key is saved in a key management service, and the key management service is executed in the trusted execution environment.

With the above method, the first key for decrypting the target data is obtained by encrypting the communication based on the first session key, the model key for decrypting the encrypted target model is saved in a trusted execution environment, and the process of decryption is also executed in the trusted execution environment, so that in the process of obtaining the data and the models, even when the data and the models are maliciously stolen, it is impossible to decrypt the data and the subsequent data processing process is also executed in the trusted execution environment. The subsequent data processing process is also executed in the trusted execution environment, thus guaranteeing the security of the data and models.

It should be noted that the data processing task includes a model fine-tuning task and a model inference task, and before executing the model fine-tuning task or the model inference task, it is necessary to deploy a model fine-tuning service or a model inference service.

In a possible implementation, the key management service stores a file key and a file key access policy for an encrypted image file, and the encrypted image file includes the first image file of the model fine-tuning service for performing a model fine-tuning task and/or the second image file of a model inference service for the target model, and the method for data processing provided by the embodiments of the present disclosure further includes: requesting the file key from the key management service via remote proof information of a proxy service in response to a deployment command for the encrypted image file, in which the remote proof information of the proxy service is used to verify a hardware environment and code logic in which the proxy service is executed; issuing the file key to the proxy service via the key management service when the remote proof information of the proxy service matches the file key access policy; and decrypting the encrypted image file according to the file key to obtain a target image file, and deploying the target image file to provide the model fine-tuning service or the model inference service.

Exemplarily, after a developer completes the development of a model fine-tuning code or a model inference application, the developer packages the code into a container image, i.e., the first image file including the model fine-tuning service or the second image file including the model inference service. After encrypting the container image by a file key (which may also called an image key), a container may be deployed in a local environment or a cloud host node, and when it is the cloud host node, it needs to run in a TEE environment, i.e., the cloud host node is a TEE node, and the model fine-tuning service or the model inference service may be deployed to a plurality of nodes to improve performance of the system and to prevent the occurrence of a single point of failure.

In a possible implementation, the method for data processing provided by embodiments of the present disclosure further includes: generating the second key in response to a remote proof request to the key management service from a developer of the encrypted image file, before the requesting the file key from the key management service via remote proof information of a proxy service in response to a deployment command for the encrypted image file; and returning the second key and the remote proof information of the key management service to the developer to enable the developer to verify a hardware environment and code logic in which the key management service is executed based on the remote proof information of the key management service, and in response to passing verification, encrypting the file key via the second key, and sending the encrypted file key and the file key access policy to the key management service for storage.

Figure 2:
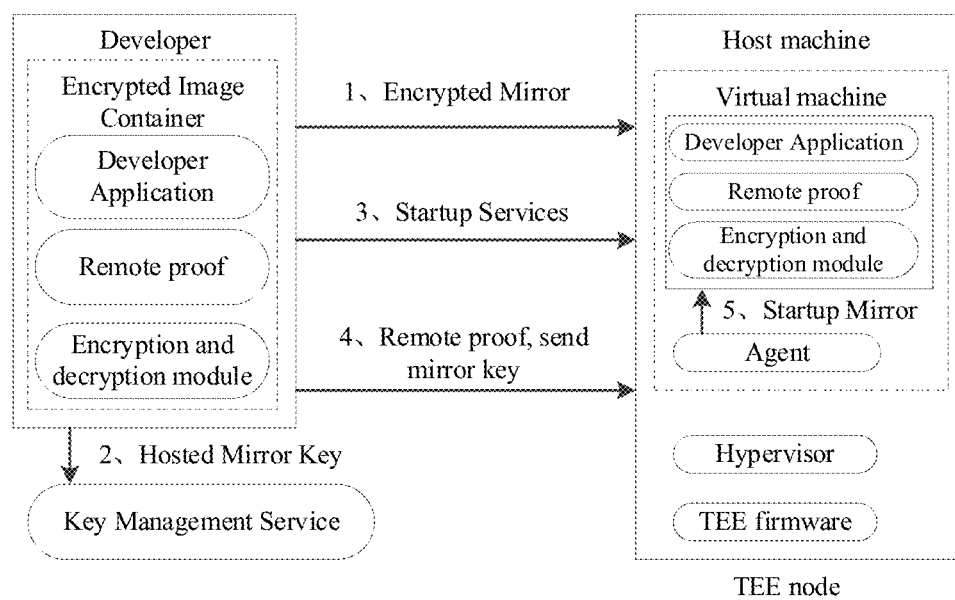
FIG. 2 is a schematic flow diagram of a model inference provided according to an exemplary embodiment.

Exemplarily, referring to FIG. 2, a developer (a developing party) sends the encrypted container image to a host machine (a device where the container image is to be deployed) or an accessible image repository (equivalent to storing the container image). The developer then initiates a remote proof request to the key management service, and the key management service receives the remote proof request and generates remote proof information and sends the remote proof information to the developer for verification.

Exemplarily, the developer initiates a remote proof request to the key management service, and the remote proof request includes a random challenge value (client_nonce), and upon receipt of the request, the key management service generates two pairs of asymmetric keys (enc_pk, enc_sk) and (sign_pk, sign_sk), and sends the following remote proof information to the developer:

1, enc_pk and sign_pk: enc_pk may be used for developer to encrypt data and sign_pk may be used to verify signature;
2, signature: the signature is obtained by encrypting client_nonce according to sign_sk.
3, proof: the proof includes a type and content of remote proof information, which may include hardware firmware information of the key management service, application metrics, customized data, and signatures, and etc. The customized data includes check information of enc_pk and sign_pk, which is used to prove that the enc_pk is generated in the TEE, thus ensuring the security of the key.

With the above remote proof information, the developer can verify that the key management service is executed in a secure hardware environment and the executed code is not tampered with, and after the enc_pk is generated in the TEE environment, the enc_pk (as the second key) is used to encrypt the image key and the encrypted image key is transmitted to the key management service. In this case, the file key access policy is set to restrict the file key use node to be in the TEE node (or specified local environment) and information such as node metric value, i.e., only specific applications deployed in a secure environment can use the file key.

Further, continuing to refer to FIG. 2, a command to start a service (deploying an image file) is sent to the host machine, and the host machine, upon receiving the command, first starts a trusted virtual machine meeting a preset requirement configuration and starts an Agent (the proxy service). In FIG. 2, the hypervisor is a virtual machine monitor. The Agent generates remote proof information and requests to obtain a file key. After the key management service determines by the remote proof information that the execution environment of the Agent and the virtual machine conforms to the file key access policy, the key management service and the Agent may negotiate a session key, and then securely send the file key via the session key. The Agent, after obtaining the file key, decrypts the image file and creates a container, and then starts the model fine-tuning service, and further, performs model fine-tuning tasks for mode fine tuning or starts the inference service application for providing the model inference service. Generating the remote proof information based on the Agent, can verify the security of the host machine where the service is deployed, thereby securing the data of the model fine-tuning code and the model inference application during the service deployment process.

An example implementation of a process for performing a model fine-tuning task is described below.

In a possible implementation, the data processing task is a model fine-tuning task, and the determining target data corresponding to the data processing task and a target first key corresponding to the target data may include: reading the target data via the target computing node based on a data path carried in the data processing task and requesting the target first key from the key management service. Determine the data processing result according to the target model and the data to be processed may include: performing the model fine-tuning task according to the data to be processed, and fine-tuning the target model according to a performing result of the model fine-tuning task to obtain a target fine-tuning model.

It should be understood that the model fine-tuning task may require to fine-tune a model based on data provided by one or more data providers, i.e., single-party modeling or joint modeling of multiple data sources is supported. The model fine-tuning task may be initiated by any of the data providers or an authorized party. Each data provider may store data (the data to be processed) locally, and then after the model fine-tuning task is initiated, the data is encrypted by a data key (the first key) to obtain the encrypted data (the target data), and then the encrypted data is sent to a facility such as a message middleware, so that the data provider only needs to send the data once and does not need to sense the complexity of the cluster. Each data provider may also send the encrypted data to the cloud service for storage after encrypting the data by the data key to meet the demand of high throughput and low latency, to improve the efficiency of data reading and writing, and to accelerate the model fine-tuning task. Therefore, the data path includes an access path to a message queue of the message middleware or a storage path in the cloud service, and the present disclosure is not limited thereto.

Exemplarily, the target computing node obtains the encrypted data from the message middleware or the cloud service corresponding to the data path, and then requests a target first key from a key management service (key holder). The key management service sends the target first key obtained by encrypting the data key based on the first session key to the target computing node. The target computing node decrypts the target first key to obtain the data key by the first session key, the target computing node decrypts the encrypted data by the data key to obtain the data to be processed, and finally performs the model fine-tuning task based on the data to be processed, and fine-tunes the target model according to the performing result of the model fine-tuning task to obtain the target fine-tuning model. Since the data involved in the model fine-tuning is encrypted at the time of acquisition, and the data key for decrypting data is stored in a trusted execution environment, the security of the data in the transmission and the model fine-tuning process can be guaranteed, and the data can thus be protected.

In addition, the model fine-tuning task may carry other identifying information such as a task number and a data provider name, so that the corresponding encrypted data may also be found based on the task number and the data provider name, and the present disclosure is not limited thereto.

In a possible implementation, the requesting the target first key from the key management service may include: requesting the target first key from the key management service, after the target computing node and the key management service perform a bi-directional remote proof based on respective remote proof information to establish the first secure channel. The remote proof information of the target computing node is used to verify a hardware environment and code logic in which the target computing node is executed, the remote proof information of the key management service is used to verify a hardware environment and code logic in which the key management service is executed, the key management service pre-stores the first key and the first key access policy, and the key management service is used to issue the target first key to the target computing node when the first key access policy matches the remote proof information of the target computing node.

Exemplarily, obtaining the data key requires the bi-directional remote proof, the above process of the developer initiating a remote proof request to the key management service is a unidirectional remote proof, the bi-directional remote proof means that both parties perform the unidirectional remote proof once, and the present disclosure is repeated herein. The data key is available only in the trusted execution environment, and the trusted execution environment encrypts the memory, which prevents the high privilege entities or other malicious applications from stealing the key information. Therefore, it is possible to verify the hardware environment and code logic in which the target computing node is executed based on the remote proof information of the target computing node, and to verify the hardware environment and code logic in which the key management service is executed based on the remote proof information of the key management service, and to encrypt and transmit the data key based on the first session key obtained through negotiation after establishing a secure channel via the bi-directional remote proof.

It should be understood that only the computing node that passes the bi-directional remote proof can obtain the data key and decrypt the encrypted data, so that decryption is not possible even when the target first key or the encrypted data is intercepted, thereby safeguarding the security of the data.

In a possible implementation, the first key and the first key access policy in the key management service are obtained by: determining, in response to a remote proof request, the second session key according to the remote proof information of the key management service by the key management service; and performing encrypted communication with a data provider of the data to be processed according to the second session key, determining the first key and the first key access policy based on the encrypted communication and storing the first key and the first key access policy. The first key is generated by the data provider or the key management service, and the first key access policy is generated by the data provider.

Figure 3:
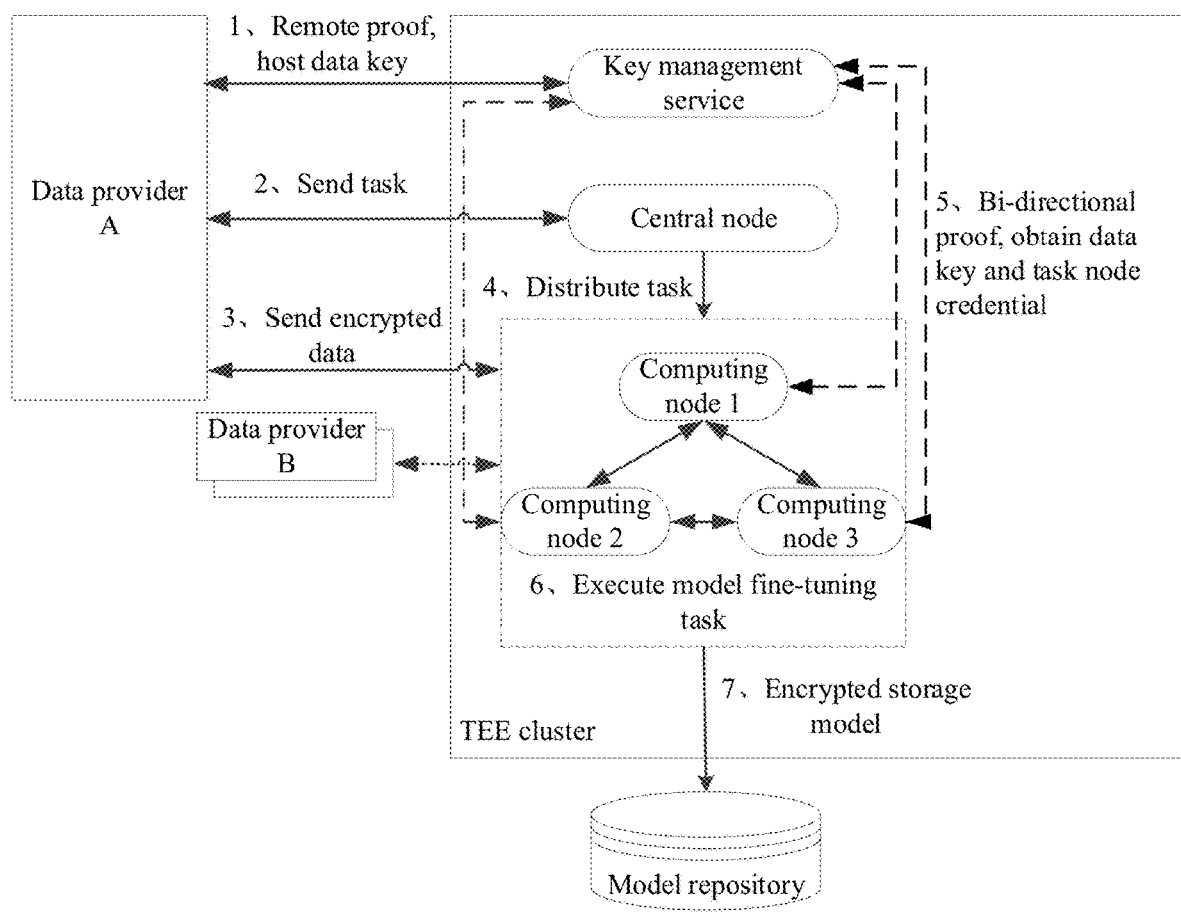
FIG. 3 is a schematic flow diagram of a process for performing a fine-tuning task according to an exemplary embodiment.

Exemplarily, as illustrated in FIG. 3, the data provider requests a remote proof from the key management service to host the data key. The data provider initiates the remote proof request to the key management service, negotiates a second session key with the key management service via the remote proof mechanism. The data key may be generated by the data provider or the key management service, and then the data key is sent to the other party via the protection of the second session key. Moreover, the data provider may also send a data key access policy to the key management service based on the second session key, for example, it may restrict that a usage node for the data key needs to be at a TEE node as well as information such as a node metric value, for which the present disclosure is not limited.

Exemplarily, the process of requesting the remote proof from the data provider to the key management service may refer to the process of requesting the remote proof from the developer to the key management service as described above, and the present disclosure is not be repeated herein. After the data provider determines, based on the remote proof information, that the key management service runs in a secure hardware environment (TEE) and that the running logic is not tampered with (by checking the value of the application metrics), and the enc_pk is generated in the TEE environment, the encrypted communication is performed based on the enc_pk (as the second session key), e.g., the data key may be generated by the data provider and sent to the key management service after the enc_pk encryption, or the data key encrypted by enc_pk sent by the key management service may be received. Thereby, storage security and transmission security of the data key are guaranteed, and thus the security of the data is guaranteed.

In addition, the enc_pk may not be used as the second session key, but rather the data provider and the key management service conduct the encrypted communication based on the enc_pk to determine the second session key, and the present disclosure is not limited thereto.

In a possible implementation, the receiving a data processing task may include: receiving the model fine-tuning task via a central node. The method for data processing provided by the embodiments of the present disclosure further includes: determining at least one target computing node for performing the model fine-tuning task according to task information of the model fine-tuning task, and distributing the model fine-tuning task to the at least one target computing node.

Exemplarily, the server-side node includes a key storage service, a central node, and a computing node, and with reference to FIG. 3, the model fine-tuning task is received via the central node, and the central node selects one or more computing nodes in a cluster to perform the model fine-tuning task according to task information such as an amount of data and a model of a current model fine-tuning task and the like; and distributes the model fine-tuning task and node information for performing the current task to each of computing nodes. The model fine-tuning task carries a task number for this task, a name of the data provider, an algorithm for model fine-tuning, hyperparameters, a data path, and other information, and the present disclosure is not limited thereto. The node information includes information such as node IP address, Port, and node role of the selected computing nodes, which is determined according to the requirements, and the present disclosure does not restrict this.

It should be understood that when a plurality of computing nodes exist, the central node may split the model fine-tuning task into a plurality of distributed tasks, and then distribute the plurality of distributed tasks to a plurality of computing nodes, in order to realize the distributed execution of the model fine-tuning task and improve the efficiency of the model fine-tuning.

In a possible implementation, the target computing node includes a plurality of target computing nodes, and the method for data processing provided by embodiments of the present disclosure further includes: requesting a task node credential from the key management service via each target computing node, before performing the model fine-tuning task according to the data to be processed; the performing the model fine-tuning task according to the data to be processed, and fine-tuning the target model according to the performing result of the model fine-tuning task to obtain the target fine-tuning model may include: performing the model fine-tuning task according to the data to be processed via the plurality of target computing nodes, and fine-tuning the target model according to the performing result of the model fine-tuning task to obtain the target fine-tuning model, in which encrypted communication is performed between each target computing node according to the task node credential for interacting with the related data of the model fine-tuning task.

Exemplarily, with continued reference to FIG. 3, each target computing node may request a data key and a task node credential from a key management service after establishing a secure channel with a key management service by conducting a bi-directional remote proof, and then the task node credential is generated and issued by the key management service. The task node credential is used to authenticate each other among the computing nodes during the execution of distributed tasks and encrypt the communication data, so that other illegal nodes cannot obtain the data key to decrypt the encrypted data, nor obtain the information interacted among the computing nodes, which further reduces the risk of leaking data.

The type of the task node credential is related to the actual task and the manner of communication between the nodes. For example, when the secure communication is conducted based on a transport layer security (TLS) protocol, the task node credential may be a certificate authority (CA) certificate, node certificate, node key, and the like. The present disclosure does not limit this.

In a possible implementation, the method for data processing provided by embodiments of the present disclosure further includes: after fine-tuning the target model according to the performing result of the model fine-tuning task to obtain the target fine-tuning model, encrypting the target fine-tuning model based on the model key, and storing the encrypted target fine-tuning model to a model repository; sending the model key and a model key access policy of the model key to the key management service for storage.

Exemplarily, as illustrated in FIG. 3, the computing node encrypts the target model based on the model key to obtain the target fine-tuning model, and the target fine-tuning model is saved to the model repository. With reference to the way the encrypted data is saved, the target fine-tuning model may also be saved locally or in a cloud service, and the present disclosure does not limit this. The model key is hosted to a key management service, and the model key may be a key generated by the computing node that is bound to a hardware, or may be generated and issued by the key management service. The model key access policy may be set up when the key is hosted, for example, restricting that a node that uses the model key must be a TEE node and information such as a node metric, so as to safeguard the model when in use.

It should be noted that the above process of fine-tuning the model may also be fine-tuned in a local environment, and the present disclosure does not limit this.

An example implementation of a process for executing a model inference task is described below. It is noted that the computing node executing the model inference task and the computing node performing the model fine-tuning task may be the same computing node or different computing nodes, and the present disclosure is not limited thereto.

In a possible implementation, the data processing task is a model inference task, the determining target data corresponding to the data processing task and a target first key corresponding to the target data may include: determining the target data and the target first key carried in the model inference task, in which the target first key is obtained by encrypting the first key using a public key of the first session key, and the first session key includes the public key and a private key. The decrypting the target first key according to the first session key via the target computing node to obtain the first key may include: decrypting the target first key according to the private key via the target computing node to obtain the first key. The determining the data processing result according to the target model and the data to be processed may include: performing model inference according to the target model and the data to be processed to obtain a model inference result.

Figure 4:
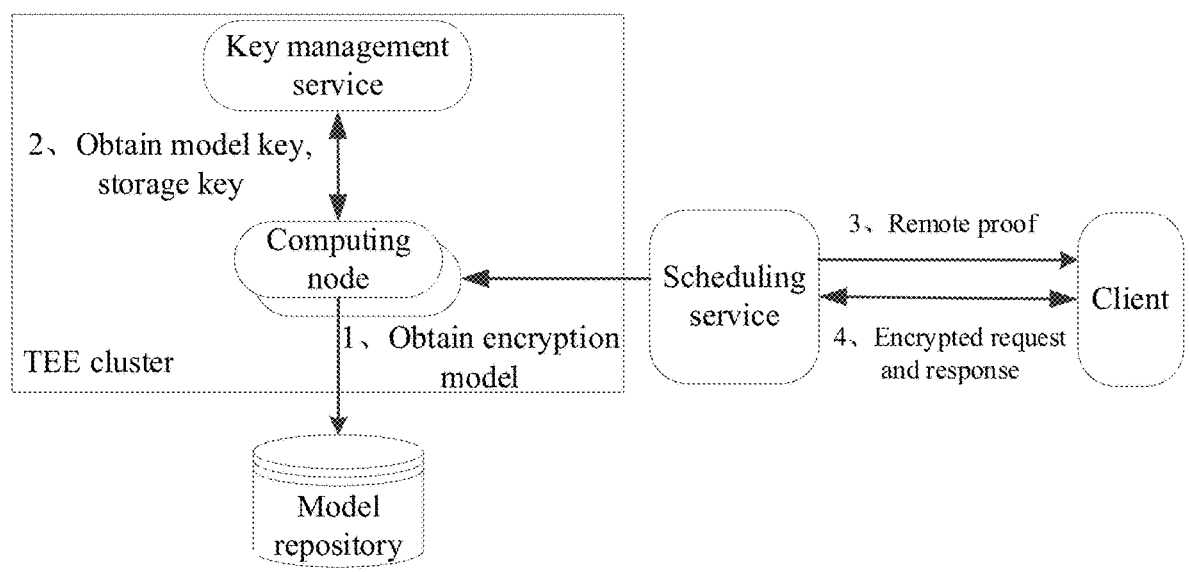
FIG. 4 is a schematic flow diagram of a process for deploying an image file according to an exemplary embodiment.

Exemplarily, referring to FIG. 4, the user initiates a model inference task via a client, the model inference task carries the target data and the target first key, in which the target first key may be obtained by encrypting the first key via the public key of the first session key, the target computing node may obtain the first key by decrypting the target first key via the private key of the first session key, and then decrypt the target data to be processed, and finally perform model inference according to the target model and the data to be processed to obtain model inference results. By encrypting the data to be processed and the first key, the security of the transmission of the data is guaranteed.

In a possible implementation, the method for data processing provided by embodiments of the present disclosure further includes: establishing, before receiving a model inference task sent by a client and in response to a remote proof request sent by the client, the third secure channel between the target computing node and the client based on remote proof information of the target computing node, in which the remote proof information of the target computing node is used to verify a hardware environment and code logic in which the target computing node is executed; and sending the public key to the client via the third secure channel to enable the client to encrypt the first key according to the public key to obtain the target first key.

Exemplarily, continuing to refer to FIG. 4, when using the model inference service, the user first initiates a remote proof request via the client, and the computing node provides the remote proof information to establish a secure channel with the client, e.g., the computing node generates a pair of asymmetric keys (a public key and a private key) via the public key encryption algorithm, and sends the public key and the remote proof information to the client, and the remote proof information may include metric value information of the inference service application, metric value information of the model, public key information, and the like, to be determined according to the verification requirements, and the present disclosure does not impose any limitation thereon. With the remote proof information, the client may verify that the computing node is running in a secure hardware environment, and that the code run by the computing node has not been tampered with, and that a specific version of the model has been loaded in accordance with the requirements, and that the public key was generated in a secure environment, and that the computing node has a corresponding private key.

Exemplarily, when the user is using the model inference service, the data encryption method for communication between the client and the computing node may be in the mode of envelope encryption, i.e., the client generates a random symmetric key (the first key) in the form of an AES-GCM (Advanced Encryption Standard; Galois Counter Mode) and other algorithms to encrypt the data to be processed by the symmetric key, and send the encrypted symmetric key and encrypted data to be processed to the computing node after encrypting the symmetric key via the public key sent by the computing node in the remote proving process. The computing node first decrypts the symmetric key using its private key to obtain the symmetric key, and decrypts the symmetric key to obtain the data to be processed, and after executing the model inference to obtain the model inference result, it may also return the model inference result encrypted using the symmetric key to the client.

It should be understood that when the model inference service is provided, information such as the model metric value is provided to the client, so that in the actual use process, the client may verify the model metric value based on the provided model metric value and the model metric value in the remote proof information, so as to ensure that the model used in the model inference service is the model content and version claimed by the model service provider. Other verifications such as node metric values, application metric values, and other remote proof information may also be referenced in the process of model metric values, and the present disclosure will not be repeated herein.

Exemplarily, when there are a plurality of computing nodes providing the model inference service, a scheduling service may also be provided, whereby the scheduling service schedules the request to a particular computing node, or a central node running in a trusted execution environment schedules the request to a particular computing node, and the present disclosure is not limited thereto.

In a possible implementation, the target model is obtained by: obtaining the encrypted target model from a model repository via the target computing node in response to an initiation of a model inference service corresponding to the target model; obtaining a model key of the encrypted target model from the key management service, after the target computing node and the key management service perform a bi-directional remote proof based on respective remote proof information to establish a fourth secure channel, in which the remote proof information of the target computing node is used to verify a hardware environment and code logic in which the target computing node is executed, the remote proof of the key management service information is used to verify the hardware environment and code logic in which the key management service is executed; and decrypting the encrypted target model according to the model key to obtain the target model.

Exemplarily, continuing to refer to FIG. 4, taking the large language model application as an example, after the large language model application is started, when the model is not directly packaged into the application, the computing node needs to first obtain the encrypted target model from the model repository. The target computing node is a computing node that provides a model inference service, and there may be a plurality of target computing nodes, i.e., each of the target computing nodes obtains the encrypted target model and then decrypts it to obtain the target model.

Exemplarily, the above-described process of bi-directional remote proof of the target computing node with the key management service may be referred to the process of bi-directional remote proof in the embodiment of performing the model fine-tuning task, and the present disclosure is not be repeated herein. After determining, according to the bi-directional remote proof, that both the target computing node and the key management service are running in a secure hardware environment (TEE) and the running logic is not tampered with (by checking application metrics), and after determining that the enc_pk (a communication key that serves as a key for transmitting the model key) is generated in the TEE environment, the encrypted communication is performed based on the enc_pk. The enc_pk may be generated by the target computing node generated or the key management service, an may be determined by negotiation. In addition, the enc_pk may not be used as a communication key, but rather the target computing node and the key management service perform the encrypted communication based on the enc_pk before determining the communication key, which is not limited by the present disclosure.

After the bi-directional remote proof is passed, a model key for the encrypted target model is obtained from the key management service, and the encrypted target model is decrypted according to the model key to obtain the target model. When the model is directly packaged into an application, there is no need to perform the process of obtaining the encrypted target model, and the subsequent process is the same, and the present disclosure is not be repeated herein.

It should be understood that the target computing node and the key management service perform a bi-directional remote proof based on respective remote proof information, and specific content of the remote proof information may be determined based on the information required for the remote proof, for example, the remote proof information provided by the computing node needs to include information such as node metrics, and the present disclosure does not limit this. Moreover, only the computing node that passes the bi-directional remote proof can obtain the model key and decrypt the encrypted target model, thereby safeguarding the security of the model. The remote proof between the client and the target computing node may be a one-way remote proof, i.e., it is sufficient to verify the remote proof information of the target computing node, and the process may refer to the remote proof process of one of the parties in the abovementioned bi-directional remote proof process, which the present disclosure is not repeat herein.

In other words, when the data is uploaded to the TEE node (including the key management service and the computing node), it is necessary to verify the remote proof information of the TEE node, and when it is necessary to obtain the data from the TEE node, it is necessary to carry out a bi-directional remote proof. The remote proof may verify the security of the environment of the TEE node and the running logic is not tampered with, so as to ensure the integrity of the service. In other words, when uploading data, it is ensured that the data is saved in a secure service, and when fetching data the legitimacy of the data fetcher is verified to ensure that the data is used in a secure environment.

It should be noted that the target model in the model fine-tuning process may be an initial model provided by a model provider, an open-source model, or a model stored in a model repository that needs to be fine-tuned again, and the present disclosure does not limit this. When the target model is a model stored in the model repository (encrypted stored model), it is necessary to obtain a corresponding model key for decryption, and the process is similar to the process of obtaining the target model for model inference, and the present disclosure is not repeat it herein.

In a possible implementation, the method for data processing provided by embodiments of the present disclosure further includes: requesting a storage key from the key management service, and determining a storage key access policy for the storage key, after the target computing node and the key management service perform the bi-directional remote proof based on the respective remote proof information to establish the fourth secure channel. The storage key is used to encrypt and store the related data of the target model in a model inference process.

Exemplarily, with continued reference to FIG. 4, the target computing node may also request the storage key from the key management service and set the storage key access policy, the storage key is generated by the key management service based on the hardware key of the key management service for subsequent storage encryption operations of the computing node, which may avoid a scenario in which the TEE node on which certain computing nodes rely does not have a hardware key, and facilitate data synchronization among the computing nodes. Of course, when the TEE node on which the computing node relies has a hardware key, the storage key may also be generated by the computing node based on the hardware key of the computing node, and the present disclosure does not restrict this.

Exemplarily, also according to the usage scenario of the model inference application, the target computing node may store data related to the model inference process, such as the model inference results, user data, or other intermediate data, after encrypting them by the storage key. Moreover, the storage key has a corresponding storage key access policy, and the storage key access policy may contain application information, metric values, etc., of the key accessor, so that a specific application may be limited to accessing the storage key to decrypt the data and carry out specific processing of the data. Thus, the data security of the relevant data in the model inference process and the data security when using the relevant data are guaranteed.

In a possible implementation, the determining the data processing result according to the target model and the data to be processed may include: distributing the data to be processed and the data processing task to a graphics processing unit, after a central processing unit establishes the second secure channel with the graphics processing unit based on remote proof information of the graphics processing unit, in which the remote proof information of the graphics processing unit is used to verify a hardware environment and code logic in which the graphics processing unit is executed; performing, via the graphics processing unit, the data processing task based on the data to be processed, and sending a performing result of the data processing task to the central processing unit; and determining, via the central processing unit, the data processing result based on the performing result of the data processing task.

Exemplarily, according to the deployment of an actual TEE cluster, a computing node usually includes at least one Central Processing Unit (CPU) and at least one Graphics Processing Unit (GPU), and the TEE technology can be implemented on both the CPU and the GPU, utilizing the trusted TEE technology can be implemented on both CPUs and GPUs, and the efficiency of data processing may be improved by utilizing trusted CPUs and GPUs to perform data processing tasks. Among other things, different vendors provide different technical solutions to implement the TEE technology on the CPU or GPU, and the present disclosure does not limit the technical solutions to implement the TEE technology.

Exemplarily, taking the execution of a model fine-tuning task as an example, remote proof information of a CPU device may be obtained to determine a trusted CPU environment, and in the trusted CPU environment, remote proof information of a GPU device is obtained, and after verifying that the GPU is trusted via the remote proof mechanism, a secure channel is established, and the data to be processed and the model fine-tuning task (including the computational logic required for the fine-tuning) are sent to the GPU, and the GPU executes the model fine-tuning task and sends the performing result to the CPU, and the GPU obtains the target model based on the performing result of the model fine-tuning task. The efficiency of model fine-tuning can be improved by executing the model fine-tuning task by GPU, especially when multiple GPUs execute the model fine-tuning task. Moreover, by verifying the CPU environment and the GPU environment, it can be guaranteed that the model fine-tuning is performed in a secure hardware environment and that the processing logic of the model fine-tuning has not been tampered with, so as to ensure the security of the entire link of data processing.

Accordingly, trusted CPU and GPU may also be utilized in executing model inference to improve the efficiency of model inference, and the process of using them is similar to that of performing the model fine-tuning task, which is not be repeated in this disclosure herein.

With the above method, the memory is encrypted using TEE technology to provide a confidential hardware environment (i.e., the TEE environment) so as to secure the data and models in use and prevent high privilege entities or other malicious applications from stealing protected data such as user data and large language model in memory. Moreover, a secure channel can be established with the TEE node via the remote proof mechanism to encrypt the data before data transmission, so as to guarantee the security of the data in transmission. In addition, via the remote proof mechanism, it can be verified that the nodes are executed in a secure TEE environment and that the running code is not tampered with, so as to ensure that the running logic and the processing of data meet the expectations, and to ensure that the models used in the model inference service are the model contents and versions claimed by the model service provider (verified according to the model metrics).

In addition, both data and models are encrypted when stored, and various keys and credentials, such as data keys, model keys, storage keys, file keys, etc., are securely managed by the key management service executed in the TEE environment, which guarantees that the nodes using the keys comply with the key access policy, prevents malicious nodes from stealing the keys, and further protects the security of the data and models. And in the process of model fine-tuning, the communication between distributed nodes is further hardened (communication via task node credential) to prevent data or model leakage from intermediate interaction information.

It should be understood that the encrypted communication methods, data encryption methods, key generation algorithms, and remote proof processes mentioned in the embodiments of the present disclosure are only exemplary illustrations, and a person skilled in the art may make adaptive adjustments according to actual needs, for example, the key may be a symmetric key or an asymmetric key, and the present disclosure does not impose any limitation thereon.

Figure 5:
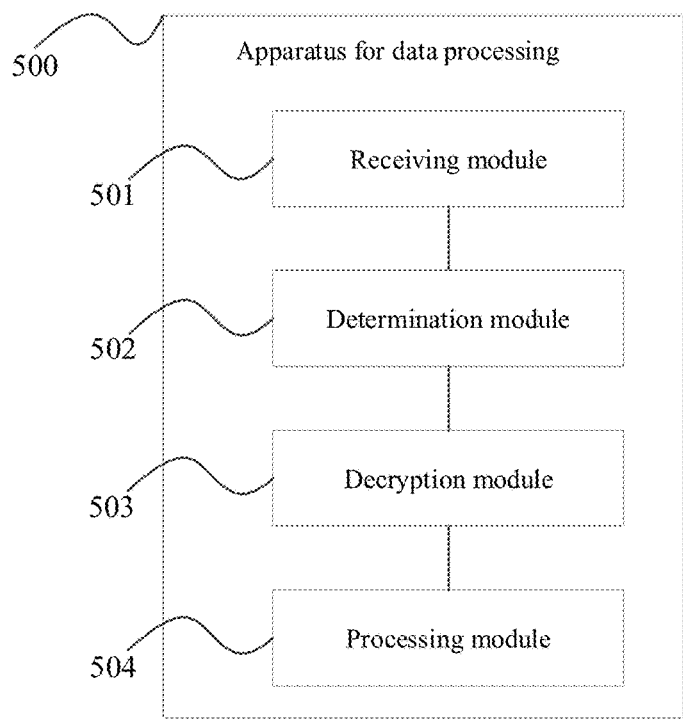
FIG. 5 is a block diagram of an apparatus for data processing provided according to an exemplary embodiment.

Based on the same inventive concept, the present disclosure provides an apparatus for data processing, referring to FIG. 5, the apparatus for data processing 500 includes: a receiving module 501, a determination module 502, a decryption module 503, and a processing module 504.

The receiving module 501 is configured to receive a data processing task.

The determination module 502 is configured to determine target data corresponding to the data processing task and a target first key corresponding to the target data, in which the target data is obtained by encrypting data to be processed using a first key, and the target first key is obtained by encrypting the first key using a first session key, and the first session key is obtained by negotiating between a task processor of the data processing task and a key holder of the first key.

The decryption module 503 is configured to decrypt the target first key according to the first session key via a target computing node to obtain the first key, and decrypt the target data based on the first key to obtain the data to be processed, in which the target computing node is executed in a trusted execution environment.

The processing module 504 is configured to determine a data processing result according to a target model and the data to be processed, in which the target model is obtained by decrypting an encrypted target model based on a model key, the model key is stored in a key management service, and the key management service is executed in the trusted execution environment.

Optionally, the data processing task is a model fine-tuning task, the determination module 502 is configured to:
  read the target data via the target computing node based on a data path carried in the data processing task and request the target first key from the key management service.

The processing module 504 includes a fine-tuning module, and the fine-tuning module is configured to:
  perform the model fine-tuning task according to the data to be processed, and fine-tune the target model according to a performing result of the model fine-tuning task to obtain a target fine-tuning model.

Optionally, the determination module 502 is configured to:
  request the target first key from the key management service, after the target computing node and the key management service perform a bi-directional remote proof based on respective remote proof information to establish a first secure channel.

The remote proof information of the target computing node is used to verify a hardware environment and code logic in which the target computing node is executed, remote proof information of the key management service is used to verify a hardware environment and code logic in which the key management service is executed, the key management service pre-stores the first key and a first key access policy, and the key management service is used to issue the target first key to the target computing node when the first key access policy matches the remote proof information of the target computing node.

Optionally, the first key and the first key access policy in the key management service are obtained by:
  determining, in response to a remote proof request, a second session key according to the remote proof information of the key management service by the key management service; and
  performing encrypted communication with a data provider of the data to be processed according to the second session key, determining the first key and the first key access policy based on the encrypted communication and storing the first key and the first key access policy, in which the first key is generated by the data provider or the key management service, and the first key access policy is generated by the data provider.

Optionally, the apparatus for data processing 500 further includes a storage module, and the storage module is configured to:
  after fine-tuning the target model according to the performing result of the model fine-tuning task to obtain the target fine-tuning model, encrypt the target fine-tuning model based on the model key, and store the encrypted target fine-tuning model to a model repository; and
  send the model key and a model key access policy of the model key to the key management service for storage.

Optionally, the target computing node includes a plurality of target computing nodes, the apparatus for data processing 500 further includes a node credential request module, and the node credential request module is configured to:
  request a task node credential from the key management service via each target computing node, before performing the model fine-tuning task according to the data to be processed.

The fine-tuning module is configured to:
  perform the model fine-tuning task according to the data to be processed via the plurality of target computing nodes, and fine-tune the target model according to the performing result of the model fine-tuning task to obtain the target fine-tuning model, in which encrypted communication is performed between each target computing node according to the task node credential for interacting with the related data of the model fine-tuning task.

Optionally, the receiving module 501 is configured to:
  receive the model fine-tuning task via a central node.

The apparatus for data processing 500 further includes a distribution module, and the distribution module is configured to:
  determine at least one target computing node for performing the model fine-tuning task according to task information of the model fine-tuning task, and distribute the model fine-tuning task to the at least one target computing node.

Optionally, the data processing task is a model inference task, and the receiving module 501 is configured to:
  determine the target data and the target first key carried in the model inference task, in which the target first key is obtained by encrypting the first key using a public key of the first session key, and the first session key includes the public key and a private key.

The decryption module 503 is configured to:
  decrypt the target first key according to the private key via the target computing node to obtain the first key.

The processing module 504 includes an inference module, and the inference module is configured to:
  perform model inference according to the target model and the data to be processed to obtain a model inference result.

Optionally, the apparatus for data processing 500 further includes a first remote proof module, and the first remote proof module is configured to:
  establish, before receiving a model inference task sent by a client and in response to a remote proof request sent by the client, a third secure channel between the target computing node and the client based on remote proof information of the target computing node, in which the remote proof information of the target computing node is used to verify a hardware environment and code logic in which the target computing node is executed; and
  send the public key to the client via the third secure channel to enable the client to encrypt the first key according to the public key to obtain the target first key.

Optionally, the target model is obtained by:
  obtaining the encrypted target model from a model repository via the target computing node in response to an initiation of a model inference service corresponding to the target model;
  obtaining a model key of the encrypted target model from the key management service, after the target computing node and the key management service perform a bi-directional remote proof based on respective remote proof information to establish a fourth secure channel, in which the remote proof information of the target computing node is used to verify a hardware environment and code logic in which the target computing node is executed, the remote proof of the key management service information is used to verify the hardware environment and code logic in which the key management service is executed;

decrypting the encrypted target model according to the model key to obtain the target model.

Optionally, the apparatus for data processing 500 further includes a storage key request module, and the storage key request module is configured to:

request a storage key from the key management service, and determining a storage key access policy for the storage key, after the target computing node and the key management service perform the bi-directional remote proof based on the respective remote proof information to establish the fourth secure channel, in which the storage key is used to encrypt and store the related data of the target model in a model inference process.

Optionally, the processing module 504 is configured to:

distribute the data to be processed and the data processing task to a graphics processing unit, after a central processing unit establishes a second secure channel with the graphics processing unit based on remote proof information of the graphics processing unit, in which the remote proof information of the graphics processing unit is used to verify a hardware environment and code logic in which the graphics processing unit is executed;

perform, via the graphics processing unit, the data processing task based on the data to be processed, and send a performing result of the data processing task to the central processing unit; and determine, via the central processing unit, the data processing result based on the performing result of the data processing task.

Optionally, the key management service stores a file key and a file key access policy for an encrypted image file, the encrypted image file includes a first image file of a model fine-tuning service for performing a model fine-tuning task and/or a second image file of a model inference service for the target model; optionally, the apparatus for data processing 500 further includes a deployment module, and the deployment module is configured to:

request the file key from the key management service via remote proof information of a proxy service in response to a deployment command for the encrypted image file, in which the remote proof information of the proxy service is used to verify a hardware environment and code logic in which the proxy service is executed;

issue the file key to the proxy service via the key management service when the remote proof information of the proxy service matches the file key access policy; and decrypt the encrypted image file according to the file key to obtain a target image file, and deploy the target image file to provide the model fine-tuning service or the model inference service.

Optionally, the apparatus for data processing 500 further includes a second remote proof module, and the second remote proof module is configured to:

generate a second key in response to a remote proof request to the key management service from a developer of the encrypted image file, before the requesting the file key from the key management service via remote proof information of a proxy service in response to a deployment command for the encrypted image file; and return the second key and the remote proof information of the key management service to the developer to enable the developer to verify a hardware environment and code logic in which the key management service is executed based on the remote proof information of the key management service, and in response to passing verification, encrypt the file key via the second key, and send encrypted file key and the file key access policy to the key management service for storage.

With respect to the apparatus in the above embodiments, the specific way in which each module performs an operation has been described in detail in connection with the method for data processing provided in the above embodiments of the present disclosure, and not be described in detail herein.

Based on the same concept, the embodiments of the present disclosure further provide a computer-readable medium storing a computer program, in which the computer program, when executed by a processor, implements the above-described method for data processing.

Based on the same concept, the embodiments of the present disclosure further provide an electronic device, and the electronic device includes: a memory and a processor.

The memory stores a computer program.

The processor is configured to execute the computer program in the memory to implement the above-described method for data processing.

Figure 6:
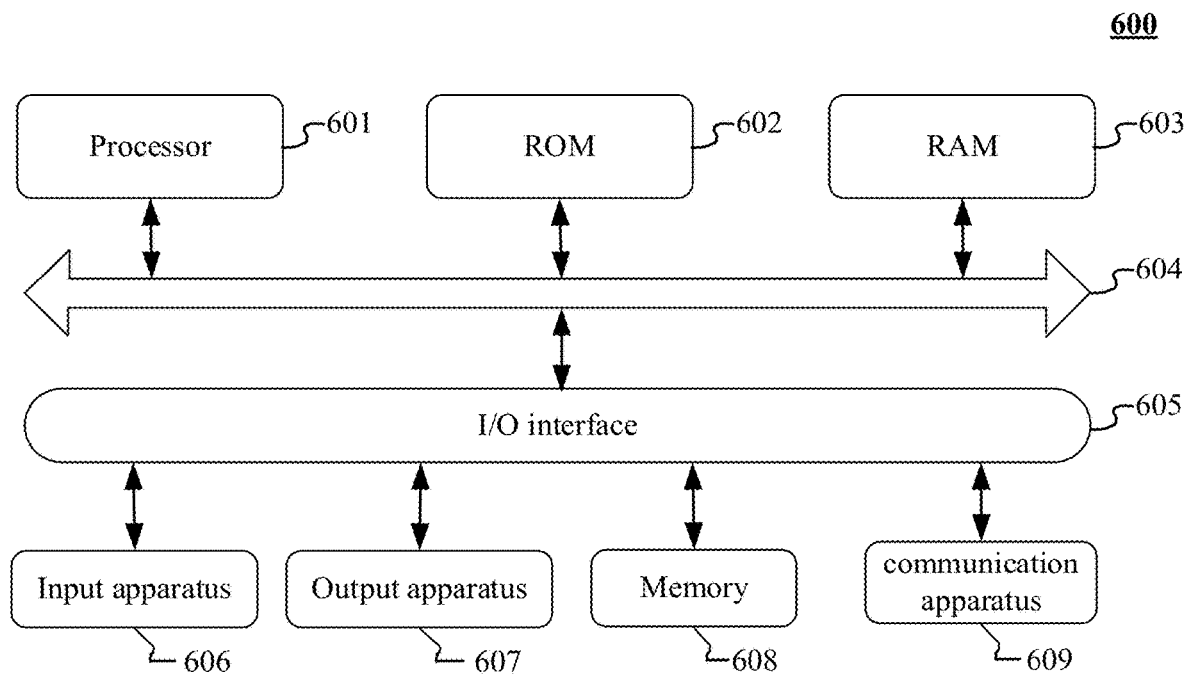
FIG. 6 is a block diagram of an electronic device provided according to an exemplary embodiment.

Referring to FIG. 6, FIG. 6 illustrates a schematic structural diagram of an electronic device 600 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP) or the like, and fixed terminals such as a digital TV, a desktop computer, or the like. The electronic device illustrated in FIG. 6 is merely an example, and should not pose any limitation to the functions and the range of use of the embodiments of the present disclosure.

As illustrated in FIG. 6, the electronic device 600 may include a processor 601 (e.g., a central processing unit, a graphics processing unit, etc.), which can perform various suitable actions and processing according to a program stored in a read-only memory (ROM) 602 or a program loaded from a memory 608 into a random-access memory (RAM) 603. The RAM 603 further stores various programs and data required for operations of the electronic device 600. The processor 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a memory 608 including, for example, a magnetic tape, a hard disk, or the like; and a communication apparatus 609. The communication apparatus 609 may allow the electronic device 600 to be in wireless or wired communication with other devices to exchange data. While FIG. 6 illustrates the electronic device 600 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods illustrated in the flowcharts. In such embodiments, the computer program may be downloaded online through the communication apparatus 609 and installed, or may be installed from the memory 608, or may be installed from the ROM 602. When the computer program is executed by the processor 601, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: receive a data processing task; determine target data corresponding to the data processing task and a target first key corresponding to the target data, in which the target data is obtained by encrypting data to be processed with a first key, and the target first key is obtained by encrypting the first key with a first session key, and the first session key is obtained by negotiation between a task processor of the data processing task and a key holder of the first key; decrypt the target first key according to the first session key via a target computing node to obtain the first key, and decrypt the target data based on the first key to obtain the data to be processed, in which the target computing node is executed in a trusted execution environment; determine a data processing result according to a target model and the data to be processed, in which the target model is obtained by decrypting an encrypted target model based on a model key, the model key is stored in a key management service, and the key management service is executed in the trusted execution environment.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks illustrated in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A method for data processing, comprising:
  receiving a data processing task;
  determining target data corresponding to the data processing task and a target first key corresponding to the target data, wherein the target data is obtained by encrypting data to be processed using a first key, the target first key is obtained by encrypting the first key using a first session key, and the first session key is obtained by negotiating between a task processor of the data processing task and a key holder of the first key;
  decrypting the target first key according to the first session key via a target computing node to obtain the first key, and decrypting the target data based on the first key to obtain the data to be processed, wherein the target computing node is executed in a trusted execution environment;
  determining a data processing result according to a target model and the data to be processed, wherein the target model is obtained by decrypting an encrypted target model based on a model key, the model key is stored in a key management service, and the key management service is executed in the trusted execution environment,
  wherein the key management service pre-stores the first key and a first key access policy, the first key and the first key access policy in the key management service are obtained by:
  determining, in response to a remote proof request, a second session key according to remote proof information of the key management service by the key management service; and
  performing encrypted communication with a data provider of the data to be processed according to the second session key, determining the first key and the first key access policy based on the encrypted communication and storing the first key and the first key access policy, wherein the first key is generated by the data provider or the key management service, and the first key access policy is generated by the data provider.

2. The method according to claim 1, wherein the data processing task is a model fine-tuning task, the determining target data corresponding to the data processing task and a target first key corresponding to the target data, comprises:
  reading the target data, via the target computing node, based on a data path carried in the data processing task, and requesting the target first key from the key management service; and
  the determining a data processing result according to a target model and the data to be processed, comprises:
  performing the model fine-tuning task according to the data to be processed, and fine-tuning the target model according to a performing result of the model fine-tuning task to obtain a target fine-tuning model.

3. The method according to claim 2, wherein the requesting the target first key from the key management service, comprises:
  requesting the target first key from the key management service, after the target computing node and the key management service perform a bi-directional remote proof based on respective remote proof information to establish a secure channel between the target computing node and the key management service, and
  wherein remote proof information of the target computing node is configured to verify a hardware environment and code logic in which the target computing node is executed, the remote proof information of the key management service is configured to verify a hardware environment and code logic in which the key management service is executed, and the key management service is configured to issue the target first key to the target computing node when the first key access policy matches the remote proof information of the target computing node.

4. The method according to claim 2, further comprising:
after fine-tuning the target model according to the performing result of the model fine-tuning task to obtain the target fine-tuning model, encrypting the target fine-tuning model based on the model key, and storing the encrypted target fine-tuning model to a model repository; and
sending the model key and a model key access policy of the model key to the key management service for storage.

5. The method according to claim 2, wherein the target computing node comprises a plurality of target computing nodes, and the method further comprises:
requesting a task node credential from the key management service via each target computing node, before performing the model fine-tuning task according to the data to be processed; and
the performing the model fine-tuning task according to the data to be processed, and fine-tuning the target model according to a performing result of the model fine-tuning task to obtain a target fine-tuning model, comprises:
performing the model fine-tuning task according to the data to be processed via the plurality of target computing nodes, and fine-tuning the target model according to the performing result of the model fine-tuning task to obtain the target fine-tuning model, wherein encrypted communication is performed between each target computing node according to the task node credential for interacting with related data of the model fine-tuning task.

6. The method according to claim 2, wherein the receiving a data processing task, comprises:
receiving the model fine-tuning task via a central node; and
the method further comprises:
determining at least one target computing node for performing the model fine-tuning task according to task information of the model fine-tuning task, and distributing the model fine-tuning task to the at least one target computing node.

7. The method according to claim 1, wherein the data processing task is a model inference task, the determining target data corresponding to the data processing task and a target first key corresponding to the target data, comprises:
determining the target data and the target first key carried in the model inference task, wherein the target first key is obtained by encrypting the first key using a public key of the first session key, and the first session key comprises the public key and a private key;
the decrypting the target first key according to the first session key via a target computing node to obtain the first key, comprises:
decrypting the target first key according to the private key via the target computing node to obtain the first key;
the determining a data processing result according to a target model and the data to be processed, comprises:
performing model inference according to the target model and the data to be processed to obtain a model inference result.

8. The method according to claim 7, further comprising:
establishing, before receiving a model inference task sent by a client and in response to a remote proof request sent by the client, a secure channel between the target computing node and the client based on remote proof information of the target computing node, wherein the remote proof information of the target computing node is configured to verify a hardware environment and code logic in which the target computing node is executed; and
sending the public key to the client via the secure channel between the target computing node and the client to enable the client to encrypt the first key according to the public key to obtain the target first key.

9. The method according to claim 7, wherein the target model is obtained by:
obtaining the encrypted target model from a model repository via the target computing node in response to an initiation of a model inference service corresponding to the target model;
obtaining a model key of the encrypted target model from the key management service, after the target computing node and the key management service perform a bi-directional remote proof based on respective remote proof information to establish a secure channel between the target computing node and the key management service, wherein remote proof information of the target computing node is configured to verify a hardware environment and code logic in which the target computing node is executed, the remote proof information of the key management service information is configured to verify the hardware environment and code logic in which the key management service is executed; and
decrypting the encrypted target model according to the model key to obtain the target model.

10. The method according to claim 9, further comprising:
requesting a storage key from the key management service, and determining a storage key access policy for the storage key, after the target computing node and the key management service perform the bi-directional remote proof based on the respective remote proof information to establish the secure channel between the target computing node and the key management service, wherein the storage key is configured to encrypt and store related data of the target model in a model inference process.

11. The method according to claim 1, wherein the determining a data processing result according to a target model and the data to be processed, comprises:
distributing the data to be processed and the data processing task to a graphics processing unit, after a central processing unit establishes a secure channel with the graphics processing unit based on remote proof information of the graphics processing unit, wherein the remote proof information of the graphics processing unit is configured to verify a hardware environment and code logic in which the graphics processing unit is executed;
performing, via the graphics processing unit, the data processing task based on the data to be processed, and sending a performing result of the data processing task to the central processing unit; and
determining, via the central processing unit, the data processing result based on the performing result of the data processing task.

12. The method according to claim 1, wherein the key management service stores a file key and a file key access policy for an encrypted image file, and the encrypted image file comprises a first image file of a model fine-tuning service for performing a model fine-tuning task and/or a second image file of a model inference service for the target model, and the method further comprises:
  requesting the file key from the key management service via remote proof information of a proxy service in response to a deployment command for the encrypted image file, wherein the remote proof information of the proxy service is configured to verify a hardware environment and code logic in which the proxy service is executed;
  issuing the file key to the proxy service via the key management service when the remote proof information of the proxy service matches the file key access policy; and
  decrypting the encrypted image file according to the file key to obtain a target image file, and deploying the target image file to provide the model fine-tuning service or the model inference service.

13. The method according to claim 12, further comprising:
  generating a second key in response to a remote proof request to the key management service from a developer of the encrypted image file, before the requesting the file key from the key management service via remote proof information of a proxy service in response to a deployment command for the encrypted image file; and
  returning the second key and the remote proof information of the key management service to the developer to enable the developer to verify a hardware environment and code logic in which the key management service is executed based on the remote proof information of the key management service, and in response to passing verification, encrypting the file key via the second key, and sending the encrypted file key and the file key access policy to the key management service for storage.

14. A non-transitory computer-readable medium storing a computer program, wherein the computer program, when executed by a processor, causes the processor to:
  receive a data processing task;
  determine target data corresponding to the data processing task and a target first key corresponding to the target data, wherein the target data is obtained by encrypting data to be processed using a first key, the target first key is obtained by encrypting the first key using a first session key, and the first session key is obtained by negotiating between a task processor of the data processing task and a key holder of the first key;
  decrypt the target first key according to the first session key via a target computing node to obtain the first key, and decrypt the target data based on the first key to obtain the data to be processed, wherein the target computing node is executed in a trusted execution environment; and
  determine a data processing result according to a target model and the data to be processed, wherein the target model is obtained by decrypting an encrypted target model based on a model key, the model key is stored in a key management service, and the key management service is executed in the trusted execution environment,
  wherein the key management service pre-stores the first key and a first key access policy, the first key and the first key access policy in the key management service are obtained by:
    determining, in response to a remote proof request, a second session key according to remote proof information of the key management service by the key management service, and
    performing encrypted communication with a data provider of the data to be processed according to the second session key, determining the first key and the first key access policy based on the encrypted communication and storing the first key and the first key access policy, wherein the first key is generated by the data provider or the key management service, and the first key access policy is generated by the data provider.

15. The non-transitory computer-readable medium according to claim 14, wherein the data processing task is a model fine-tuning task, and the processor is further configured to:
  read the target data, via the target computing node, based on a data path carried in the data processing task, and request the target first key from the key management service; and
  perform the model fine-tuning task according to the data to be processed, and fine-tune the target model according to a performing result of the model fine-tuning task to obtain a target fine-tuning model.

16. The non-transitory computer-readable medium according to claim 15, wherein the processor is further configured to:
  request the target first key from the key management service, after the target computing node and the key management service perform a bi-directional remote proof based on respective remote proof information to establish a secure channel between the target computing node and the key management service,
  wherein remote proof information of the target computing node is configured to verify a hardware environment and code logic in which the target computing node is executed, the remote proof information of the key management service is configured to verify a hardware environment and code logic in which the key management service is executed, and the key management service is configured to issue the target first key to the target computing node when the first key access policy matches the remote proof information of the target computing node.

17. An electronic device, comprising:
  a memory, storing a computer program; and
  a processor, configured to execute the computer program in the memory to:
  receive a data processing task;
  determine target data corresponding to the data processing task and a target first key corresponding to the target data, wherein the target data is obtained by encrypting data to be processed using a first key, the target first key is obtained by encrypting the first key using a first session key, and the first session key is obtained by negotiating between a task processor of the data processing task and a key holder of the first key;
  decrypt the target first key according to the first session key via a target computing node to obtain the first key, and decrypt the target data based on the first key to obtain the data to be processed, wherein the target computing node is executed in a trusted execution environment; and
  determine a data processing result according to a target model and the data to be processed, wherein the target model is obtained by decrypting an encrypted target model based on a model key, the model key is stored in a key management service, and the key management service is executed in the trusted execution environment, wherein the key management service pre-stores the first key and a first key access policy, the first key and the first key access policy in the key management service are obtained by:

determining, in response to a remote proof request, a second session key according to remote proof information of the key management service by the key management service, and performing encrypted communication with a data provider of the data to be processed according to the second session key, determining the first key and the first key access policy based on the encrypted communication and storing the first key and the first key access policy, wherein the first key is generated by the data provider or the key management service, and the first key access policy is generated by the data provider.

18. The electronic device according to claim 17, wherein the data processing task is a model fine-tuning task, and the processor is further configured to:

read the target data, via the target computing node, based on a data path carried in the data processing task, and request the target first key from the key management service; and perform the model fine-tuning task according to the data to be processed, and fine-tune the target model according to a performing result of the model fine-tuning task to obtain a target fine-tuning model.

19. The electronic device according to claim 18, wherein the processor is further configured to:

request the target first key from the key management service, after the target computing node and the key management service perform a bi-directional remote proof based on respective remote proof information to establish a secure channel between the target computing node and the key management service, wherein remote proof information of the target computing node is configured to verify a hardware environment and code logic in which the target computing node is executed, the remote proof information of the key management service is configured to verify a hardware environment and code logic in which the key management service is executed, and the key management service is configured to issue the target first key to the target computing node when the first key access policy matches the remote proof information of the target computing node.

20. The electronic device according to claim 17, wherein the data processing task is a model inference task, wherein determining target data corresponding to the data processing task and a target first key corresponding to the target data comprises:

determining the target data and the target first key carried in the model inference task, wherein the target first key is obtained by encrypting the first key using a public key of the first session key, and the first session key comprises the public key and a private key;

wherein decrypting the target first key according to the first session key via a target computing node to obtain the first key comprises decrypting the target first key according to the private key via the target computing node to obtain the first key; and wherein determining a data processing result according to a target model and the data to be processed comprises performing model inference according to the target model and the data to be processed to obtain a model inference result.

* * * * *